7883X
B. D. Beecher,
Horse Power.
Patented Dec. 23, 1833.
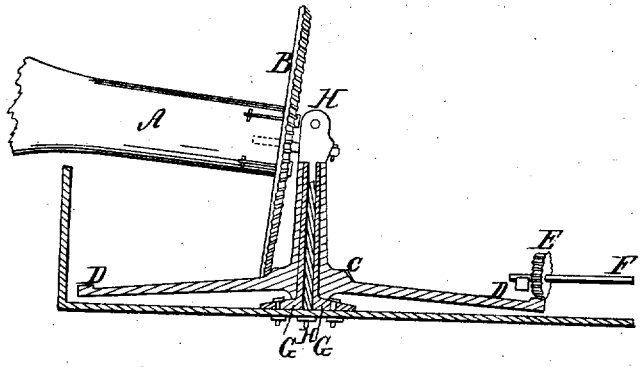
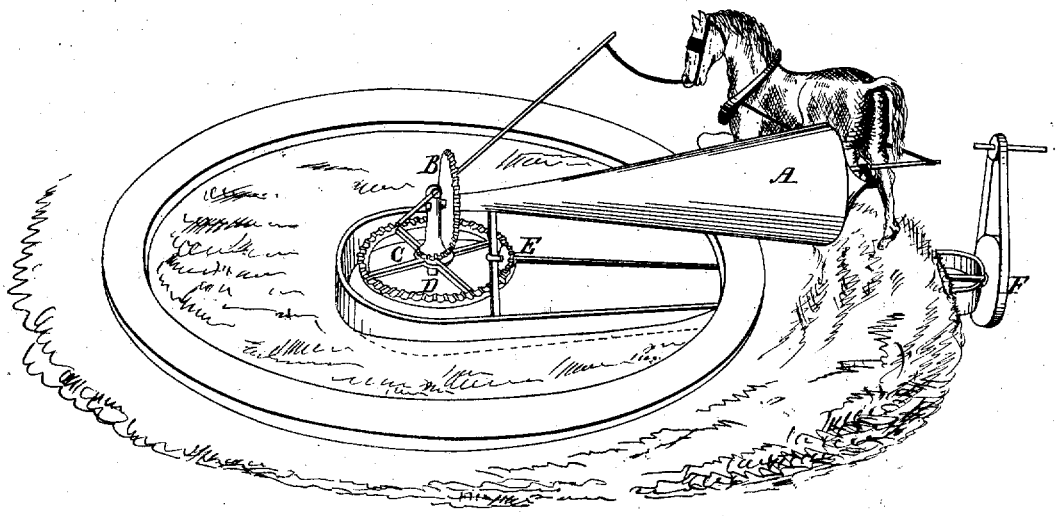
AM. PHOTO-LITHO. CO. N.Y. (OSBORNE'S PROCESS)

Benjamin D Beecher of Cheshire Connecticut
Letters Patent

The Schedule referred to in these Letters Patent and making part
of the same containing a description in the words of the said
Benjamin D Beecher himself of his improvement in Horse Power.

To all persons to whom these presents shall come. Benjamin
D. Beecher of Connecticut New Haven County of the Town of
Cheshire send Greeting.   Be it Known that I Benjamin
D. Beecher have invented constructed and applied to use a
new and useful improvement in machinery for animal
power. commonly called Horse power. said improvement and its
manner of building are as follows.  1st This machine is built
by having a plank ten feet long and 10 inches wide and two
thick. placed nine inches below the floor or surface of the
ground and boards nailed across at one end in such a
manner as to form a circle or eight cornered box three
feet diameter seven sides of which are boarded up ten
inches high and a box is formed ten inches square to re-
ceive the line Shaft.   2nd At the centre is an upright tube
or socket bolted firm to the plank eight inches long three inches
diameter at bottom and two inches at top with a hole through
the centre one and one fourth inches diameter true and smooth
3d on the outside is a hub well fitted seven inches long. the
lower end being connected to a level cogwheel thirty inches diame-
ter facing upwards and meshing into a pinion of six inches
on a line Shaft running horizontally through the ten inch box.
4th To the end of the Shaft is fastened a band wheel twen-
ty six inches diameter from which speed is given to the ma-
chinery —   5th In the tube is a wrought iron bolt with a
head at bottom the top being made fast in a cast iron head
through which are two holes at right angles one above the 3[illegible] 7883X other the top one to remain a pole to lead the horse, the other a gudg-
eon made fast in a bevel wheel twenty two inches diameter
mashing into a pinion made fast to the arms of the thirty
inch wheel. 6th To the back of this wheel is a wood shaft sev-
en feet long in form of a cone thirty inches diameter at one end, sev-
en at the other the small end attached to the wheel, the other to
the horse, this shaft rolls round on a platform or railway after the
Horse by which means six turns are given to one of the Horse. –
producing two hundred and fifty turns per minute on the line shaft.
7th By means of this cone and railway a complete relief is giv-
en so that the Horse cannot exert any undue influence over the
machinery. 8th A similar speed may be given by a wheel attach
ed to a lever with cogs on it, mashing into a pinion the shaft of
which may extend to the centre of action, or into the body of a
cart. making a travelling machine.
9th The proportions may be varied in any way to suit the fancy
or convenience of the builder or owner.
What I especially claim as my Invention and improvement
is the Rolling Shaft or wheel on a smooth surface and the manner of
constructing and operating the machine.
Reference. – A. the revolving shaft to which the wheel B. is
firmly fastened. C. pinion nine inches made fast to the arms of the
wheel D. thirty inches E pinion six inches. F line shaft exten
ding to the [illegible] outside of the horse track
Witnesses
Gideon T. Marihugh
D. T. Marihugh Benjamin O. Becker (Dr in portfolio)

(0.48 [illegible]) ([illegible] 23 Dec 1833)